(12) United States Patent
Sundaram et al.

(10) Patent No.: US 10,348,702 B1
(45) Date of Patent: Jul. 9, 2019

(54) COMMAND PARAMETER RESOLUTION FOR COMMAND INVOCATIONS

(71) Applicant: Amazon Technologies, Inc., Seattle, WA (US)

(72) Inventors: Manivannan Sundaram, Bothell, WA (US); Ananth Vaidyanathan, Seattle, WA (US); Junyin Wu, Issaquah, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 15/353,526

(22) Filed: Nov. 16, 2016

(51) Int. Cl.
*H04L 29/06* (2006.01)
*H04L 9/08* (2006.01)

(52) U.S. Cl.
CPC .......... *H04L 63/0471* (2013.01); *H04L 9/083* (2013.01); *H04L 9/0822* (2013.01); *H04L 9/0825* (2013.01)

(58) Field of Classification Search
CPC . H04L 63/0471; H04L 9/0825; H04L 9/0822; H04L 9/083
See application file for complete search history.

(56) References Cited

U.S. PATENT DOCUMENTS

| 6,574,790 | B1* | 6/2003 | Abramson | ........ G06F 17/30893 707/E17.117 |
| 7,111,162 | B1* | 9/2006 | Bagepalli | ............ H04L 63/0428 709/227 |
| 2004/0190046 | A1* | 9/2004 | Ilda | .................... H04N 1/00209 358/1.15 |
| 2008/0288508 | A1* | 11/2008 | Alcorn | .................... G06F 9/465 |
| 2017/0099144 | A1* | 4/2017 | Sobel | .................... H04L 63/083 |

\* cited by examiner

*Primary Examiner* — Mahfuzur Rahman
(74) *Attorney, Agent, or Firm* — Thorpe North & Western, LLP (57) ABSTRACT

A technology is described for resolving command parameter that are included in command invocations. An example method may include receiving a request to invoke a command that includes a command parameter. The command may be executed by a software agent hosted on a computing resource managed within a service provider environment. In response to the request, a parameter value for the command parameter may be obtained from a parameter data store using a parameter ID. A command message having command instructions to execute the command the parameter value may be generated and the command message may be encrypted using a cryptographic key associated with the software agent. The command message may then be sent to the software agent, enabling the software agent to decrypt the command message and execute the command.

21 Claims, 7 Drawing Sheets

COMMAND PARAMETER RESOLUTION FOR COMMAND INVOCATIONS

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Customers of a service provider may remotely manage the configuration of computing instances using individual commands sent to the computing instances. For example, commands may be used to set configuration attributes for a computing instance, update software installed on a computing instance, stop or start a computing instance, determine a dynamic structure of a distributed application hosted by computing instances, as well as other commands associated with managing computing instances. Commands used to manage the configuration of computing instances may include command parameters, which can be specified by a customer. Example command parameters may include software license keys, network addresses, database connection strings, user IDs, etc. A customer may provide a command parameter and the command parameter may be included in a command invocation sent to one or more computing instances.

DETAILED DESCRIPTION

A technology is described for resolving command parameters for inclusion in command invocations sent to software agents hosted on managed computing resources. In one example, a computing service provider may provide customers with a service that securely stores command parameters, which can be resolved and retrieved in response to a command request that sends command invocations to software agents hosted on managed computing resources which use the command parameters to execute the command. Computing resources (e.g., computing instances or physical hosts) that host software agents may be located in data centers managed by a service provider which provides customers with a service provider environment, and/or the computing resources may be located on a customer's premises and managed by the customer. Computing resources managed by the service provider may include, but are not limited to: computing instances, virtualized storage, data storage services, virtualized network resources, as well as other managed computing resources. For the sake of convenience, this disclosure will primarily describe targets for command invocations in the context of computing instances with the understanding that other computing resources (e.g., physical hosts or other virtualized compute services) are within the scope of this disclosure.

A command may instruct a software agent hosted on a computing instance to perform an administrative task, such as collect information or perform an action. For example, a command may include an ad hoc command used to configure a computing instance, a policy command used to implement an ongoing policy on a computing instance, or an automation command that executes an automation workflow on a computing instance. A command may include one or more command parameters, which may be used to execute the command. As a specific example, a command to install a software package on a computing instance may include a URI (Uniform Resource Identifier) used to retrieve a software package for installation on the computing instance and a software license key used to activate the software package.

In the past, customers of a computing service provider created command documents that included both command instructions and command parameters. Command documents (e.g., data-interchange documents like JSON (JavaScript Object Notation) or XML (Extensible Markup Language)) may be sent to computing instances for execution by software agents in response to a command request. Anytime that a command parameter needed to be updated (e.g., update a URI, license key, etc.), a customer would have to update each command document that included the command parameter, such that the customer would have to identify command documents that included the command parameter and manually edit the command documents to update the command parameter, potentially resulting in a significant amount of time needed to identify and update command documents, as well as increasing the chance that incorrect parameter values would be entered.

As a result of the current technology, a computing service provider may securely manage parameter-value pairs provided by customers. The parameter-value pairs may be resolvable, meaning that a customer may provide a reference to a parameter-value pair managed by the computing service provider in a request to invoke a command, and the reference may be resolved to identify the parameter-value pair, enabling a parameter value to be retrieved and inserted into a command message that is then sent to the customer's computing instances for execution by software agents.

Figure 1:
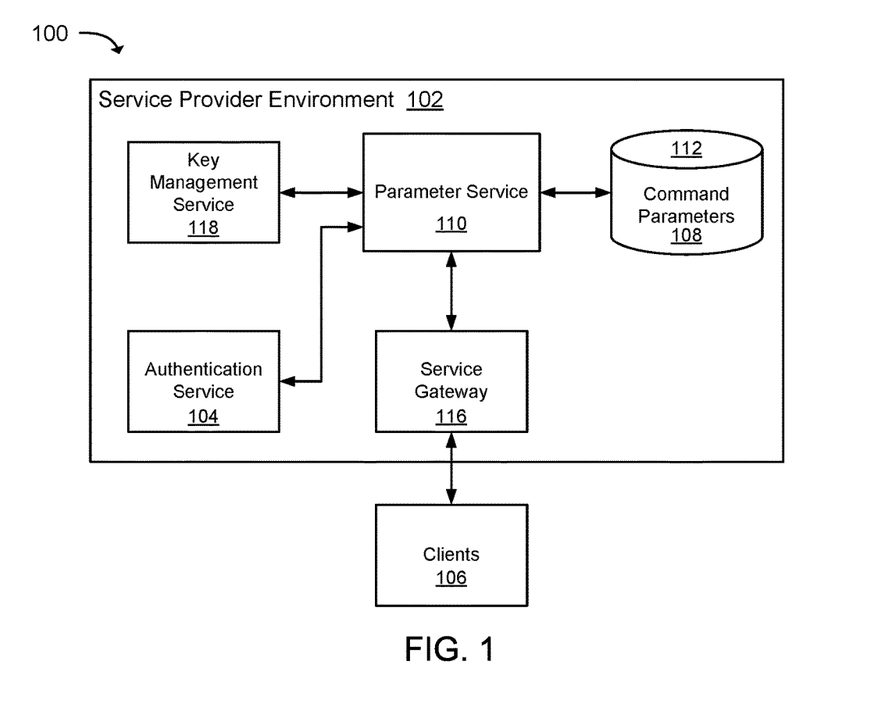
FIG. 1 is a block diagram illustrating an example system for managing command parameters included in command invocations sent to computing instances.

To further describe the present technology, examples are now provided with reference to the figures. Accordingly, FIG. 1 is a diagram illustrating one example of a system 100 that may be used to manage command parameters 108 included in command invocations sent to computing instances. As illustrated, the system 100 may include a service provider environment 102 that includes a parameter service 110 configured to manage command parameters 108 on behalf of customers of a computing service provider. A service gateway 116 may provide clients 106 with an interface to the parameter service 110, enabling customers to submit command parameters 108 to the parameter service 110 for safekeeping and for inclusion in command invocations requested by the customers.

In one example, a command parameter 108 may comprise a parameter-value pair that has a parameter identifier and one or more parameter values. As a specific example, a parameter-value pair for a product license may have a parameter ID of "Product A License Key" and a parameter value of "Ut1575a1TAir". A command invocation sent to a computing instance may include a command message that contains command instructions and one or more command parameters 108. As an example, a command message may include command instructions that instruct a software agent on a computing instance to update a software package on the computing instance and the command message may include a command parameter 108 for a software license key that includes a license key value. Of course this is just one example of a command and command parameter that may be included in a command message, other examples of commands and command parameters are also within the scope of the present technology.

Customers may submit command parameters 108 to the parameter service 110, which may be configured to manage the command parameters 108, for example, by storing the command parameters 108 to a parameter data store 112 and providing the command parameters 108 for inclusion in command invocations. Prior to storing command parameters 108 to the parameter data store 112, the command parameters 108 may be encrypted. A key management service 118 may be used to encrypt command parameters 108. The key management service 118 may be an encryption service managed by a computing service provider. The key management service 118 may provide cryptographic key storage. Customers may provide the customer's own cryptographic keys for storage and management to the key management service 118, as well as request that the key management service 118 generate and store cryptographic keys for use by the customers. In one example, the key management service 118 may provide encryption services to customers, such that a customer may submit an item to the key management service 118 for encryption/decryption, and the item may be returned to the customer.

In another example, the parameter service 110 may obtain a cryptographic key from the key management service 118 and encrypt a command parameter 108 using the cryptographic key prior to storing the command parameter to the parameter data store 112. For example, the key management service 118 may be asked to generate or supply a cryptographic key and the cryptographic key may be provided to the parameter service 110. Further, the key management service 118 may be configured to associate the cryptographic key generated for the customer with a customer account and store the cryptographic key on behalf of the customer. In another example, a customer may upload the customer's cryptographic key to the key management service 118, which may manage the customer's cryptographic key, and provide the customer's cryptographic key in response to requests. As part of obtaining a cryptographic key from the key management service 118, an authentication service 104 may be queried to determine whether a customer that submitted the command parameter 108 to the parameter service 110 has an assigned or delegated security role that allows access to services provided by the key management service 118.

In another example, the key management service 118, as indicated above, may be configured to encrypt a command parameter 108 submitted to the key management service 118 using a cryptographic key managed by the key management service 118. The parameter service 110 may submit a command parameter 108 to the key management service 118 for encryption using a cryptographic key generated by the key management service 118 or a customer's own cryptographic key uploaded to the key management service 118. After encrypting the command parameter 108, the key management service 118 may return the command parameter 108 to the parameter service 110. As indicated above, as part of submitting a command parameter 108 to the key management service 118 for encryption, the authentication service 104 may be queried to determine that a customer associated with the command parameter 108 has an assigned security role that allows access to services provided by the key management service 118.

The parameter service 110 may include a data dictionary (not shown) that contains metadata for command parameters 108 managed by the parameter service 110. As part of storing a command parameter 108 to the parameter data store 112, the parameter service 110 may be configured to add metadata for command parameters 108 to the data dictionary. The metadata may help customers manage their command parameters. For example, the metadata may be shown in a parameter management console, allowing customers to more easily recognize command parameters and associations of the command parameters to commands. Illustratively, the metadata may include a parameter name, parameter description, parameter command associations (i.e., commands that include the command parameter), parameter encryption information, as well as other parameter metadata. The parameter metadata may be referenced in association with the parameter service 110 receiving a request to provide a command parameter 108.

Figure 2:
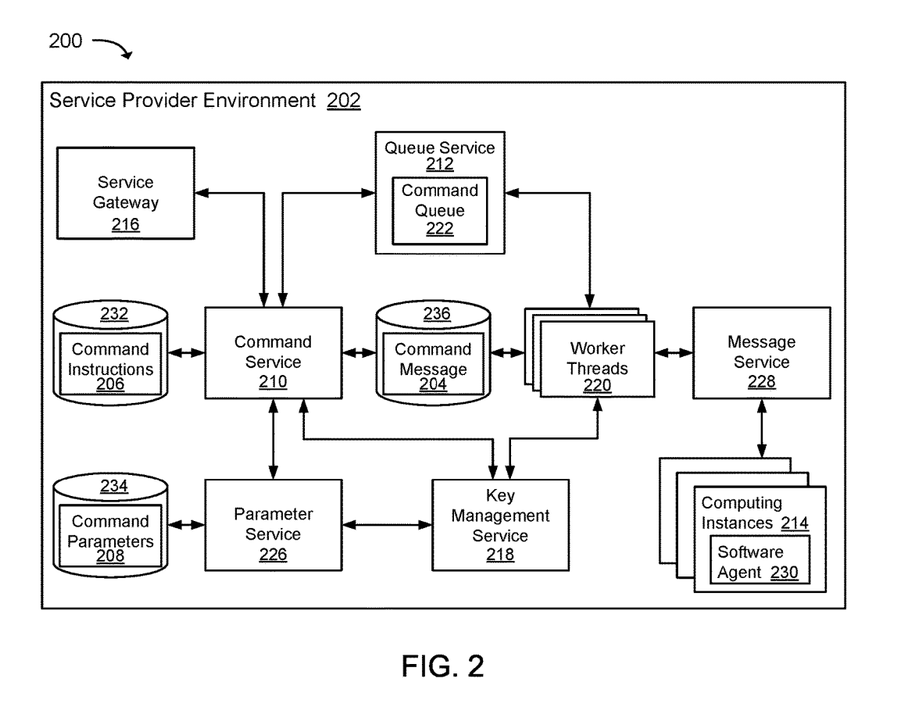
FIG. 2 is a block diagram that illustrates various example components included in a system for invoking commands that include command parameters.

FIG. 2 illustrates components of an example system 200 on which the present technology may be executed. The system 200 may be hosted in a service provider environment 202 and may be made accessible to customers of a computing service provider. The service provider environment 202 may include computing resources used to host managed services, as well as computing resources for executing computing instances 214. In addition, the components or computing resources (e.g., servers) shown in the service provider environment 202 may be implemented using computing instances or, alternatively, physical servers. In some examples, computing resources used to execute a computing instance 214 may be located on a customer's premises (e.g., customer owned data center) and may be in networked connection with the services provided in the service provider environment 202 of a computing service provider. The service provider environment 202 is described in greater detail later in association with FIG. 3.

As illustrated, the system 200 may include a number of services used to create and send command invocations that include command parameters to computing instances 214. A command invocation may instruct a software agent 230 hosted on a computing instance 214 to perform an administrative task (e.g., update software installed on a computing instance 214, collect information related to a computing instance 214, determine a dynamic structure of a distributed application hosted by computing instances 214, modify attributes of a computing instance 214, etc.). A command invocation may include command instructions 206 and one or more command parameters 208 used to execute a command. As a non-limiting example, a command invocation may comprise sending a command message 204 to a software agent 230 hosted on a computing instance 214. The command message 204 may include command instructions 206 for the software agent 230 to locate a file having a specified serial number and a command parameter 208 that specifies the serial number of the file.

The system 200 may include a service gateway 216 configured to receive command requests from clients and authenticate customers associated with the command requests. After authenticating a customer associated with a command request, the service gateway 216 may forward the request to the command service 210. The command service 210 may be configured to handle requests associated with invoking commands over one or more computing instances 214. In response to receiving a command request, the command service 210 may be configured to construct a command message 204 that includes command instructions 206 and one or more command parameters 208 associated with the command. In one example, a command message 204 may be constructed using a data-interchange format like JSON, XML, or another data-interchange format. Command instructions 206 may comprise attribute-value pairs (e.g., "CommandName: Join_Instance_to_domain") and command parameters 208 may comprise parameter-value pairs (e.g., "DNS_IPAddress: 12.232.32.11"). Command instructions 206 may include one or more references to command parameters 208 managed by the parameter service 226 as described earlier in association with FIG. 1. The command parameters 208 may be notated or positioned in the command syntax in such a way as to indicate that the command parameters 208 are to be populated with values from the parameter service 226 as a command message 204 is constructed. A reference to a command parameter 208 in command instructions 206 may be resolved by presenting a parameter ID for the command parameter 208 to the parameter service 226, which identifies the command parameter using the parameter ID and returns the command parameter 208 (e.g., parameter value) to be inserted into the command instructions, forming a data-interchange document that can be sent to a computing instance 214.

In one example configuration, in response to receiving a command request, the command service 210 may be configured to retrieve command instructions 206 related to the command request from a command instruction data store 232 (e.g., an object data store or a NoSQL data store) and make a request to the parameter service 226 for command parameters 208 referenced by the command instructions. For example, the command request may include a command ID used to obtain command instructions 206 associated with the command ID from the command instruction data store 232, and one or more parameter IDs used to obtain command parameters 208 associated with the parameter IDs from the parameter service 226.

In response to a request for a command parameter 208, the parameter service 226 may be configured to retrieve the command parameter 208 from a parameter data store 234. In one example, a request for a command parameter 208 may include a parameter ID for the command parameter 208. The parameter ID may identify a command parameter 208 managed by the parameter service 226 on behalf of a customer. The parameter ID may be used to query a data dictionary (not shown) to identify the command parameter 208 associated with the customer's account and retrieve the command parameter 208 from the parameter data store 234.

In the case that a command parameter 208 requested from the parameter service 226 is encrypted, the parameter service 226 may be configured to decrypt the command parameter 208 before returning the command parameter 208 to the command service 210. In one example, an encrypted command parameter 208 may be submitted to a key management service 218 for decryption. The key management service 218 may perform the functions described earlier in association with FIG. 1.

Customer account information may be submitted to the key management service 218 along with the command parameter 208. The key management service 218 may be configured to identify a cryptographic key associated with the customer account and decrypt the command parameter 208 using the customer's cryptographic key and return the unencrypted command parameter 208 to the parameter service 226. In one example, the key management service 218 may decrypt the command parameter 208 in volatile computer memory and delete the unencrypted command parameter 208 from the volatile computer memory after returning the unencrypted command parameter 208 to the parameter service. As such, the unencrypted command parameter 208 is not placed in non-volatile computer memory where the unencrypted command parameter 208 may be vulnerable. After receiving the unencrypted command parameter 208 from the key management service 218, the parameter service 226 may return the unencrypted command parameter 208 to the command service 210. Likewise, the parameter service 226 may delete the unencrypted command parameter 208 from volatile computer memory without ever having stored the unencrypted command parameter 208 on non-volatile computer memory.

In another example where a command parameter 208 retrieved by the command service 210 from the parameter data store 234 is encrypted, the parameter service 226 may be configured to obtain a cryptographic key used to encrypt the command parameter 208 from the key management service 218. For example, customer account information may be provided to the key management service 218 and the customer account information may be used to identify a cryptographic key associated with the customer account information and return the cryptographic key to the parameter service 226. In this configuration, the parameter service 226 may decrypt the command parameter 208 using the cryptographic key, and thereafter delete the cryptographic key from volatile computer memory, such that the cryptographic key may not be stored to non-volatile computer memory. The parameter service 226 may return the unencrypted command parameter 208 to the command service 210. In the case that a command parameter 208 requested from the parameter service 226 is not encrypted, the parameter service 226 may simply retrieve the command parameter 208 from the parameter data store 234 and return the command parameter 208 to the command service 210.

The command service 210 may be configured to construct a command message 204 that includes command instructions 206 obtained from the command instruction data store 232 and command parameters 208 obtained from the parameter service 226. In one example, after constructing a command message 204, the command service 210 may be configured to encrypt the command message 204 using a cryptographic key obtained from the key management service 218 and store the command message 204 in temporary storage 236 (e.g., computer memory or a data store) for a period of time that allows for one or more command invocations to be processed. As such, sensitive information that may be contained in a command parameter 208 included in a command message 204 may be protected during processing of a command invocation that sends the command message 204 to a computing instance 214. In some examples, in addition to storing the command message 204 for a period of time, a cryptographic key used to encrypt the command message 204 may be encrypted and stored with the command message 204 in temporary storage 236. The cryptographic key may be provided to a software agent 230 along with the command message 204, and the software agent 230 may decrypt the command message 204 using the cryptographic key as explained in greater detail below.

After constructing a command message 204, the command service 210 may be configured to send the command message 204 to one or more computing instances 214 identified in a command request to receive the command message 204. In the example illustrated, the command service 210 may be configured to place a command notification in a command queue 222 for processing by a worker thread 220. The command queue 222 may be managed using a queue service 212. A worker thread 220 may be assigned to retrieve the command notification from the command queue 222 and the worker thread 220 may generate one or more command invocations in accordance with the command notification. As an example, the worker thread 220 may obtain information for a set of computing instances that are to receive command invocations and for each computing instance 214 included in the set of computing instances, the worker thread 220 may retrieve a command message 204 from temporary storage 236 and send the command message 204 to a computing instance 214, until each computing instance 214 in the set receives the command message 204.

As indicated above, a command message 204 and a cryptographic key used to encrypt the command message 204 may be sent to a software agent 230 hosted on a computing instance 214, and the software agent 230 may decrypt the command message 204 using the cryptographic key. In one example, the cryptographic key sent with the command message 204 to the software agent 230 may be encrypted using a public-key owned by a computing instance 214 that hosts the software agent 230. As a specific example, the command service 210 may be configured to encrypt a command message 204 using a cryptographic key obtained from the key management service 218 and then encrypt the cryptographic key. The command service 210 then places the encrypted command message 204 and the encrypted cryptographic key in temporary storage 236. A worker thread 220 assigned to send the command message 204 to one or more software agents 230 may obtain the encrypted command message 204 and the encrypted cryptographic key from the temporary storage 236 and submit the encrypted cryptographic key to the key management service 218 to be decrypted. The key management service 218 may return the unencrypted cryptographic key to the worker thread 220. The worker thread 220 may then obtain a public-key owned by a computing instance 214 that hosts the software agent 230 and the worker thread 220 may encrypt the cryptographic key using the public-key. The command message 204 and the encrypted cryptographic key may be sent to the computing instance 214 via a message service 228, and the software agent 230 may unencrypt the cryptographic key using a private-key owned by the computing instance 214/software agent 230 and unencrypt the command message 204 using the unencrypted cryptographic key. The worker thread 220 may repeat the process for each software agent 230 that is to receive the command message 204 by obtaining public-keys owned by computing instances 214/software agents 230.

In another example, a worker thread 220 assigned to process a command notification may send a command message 204 to one or more software agents 230 that have been encrypted using public-keys associated with computing instances 214 that host the software agents 230. As a specific example, a worker thread 220 may retrieve an encrypted command message 204 from temporary storage 236 and either, submit the encrypted command message 204 to the key management service 218 to be decrypted, or obtain a cryptographic key that was used to encrypt the command message 204 from the key management service 218 and decrypt the command message 204 using the cryptographic key. The worker thread 220 may then obtain a public-key for a computing instance 214/software agent 230 that is to receive a command message 204 and encrypt the command message 204 using the public-key. Thereafter, the worker thread 220 may send the command message 204 to the computing instance 214 and the software agent 230 hosted on the computing instance 214 may unencrypt the command message 204 using a private-key.

In yet another example, an encrypted command message 204 may be sent to one or more computing instances 214 and a software agent 230 on a computing instance 214 may obtain a cryptographic key that was used to encrypt the command message 204 from the key management service 218 and unencrypt the command message 204 using the cryptographic key. As a specific example, a worker thread 220 may retrieve a command message 204 from temporary storage 236. The command message 204 may have been encrypted using a cryptographic key managed by the key management service 218. The worker thread 220 may send the encrypted command message 204 to one or more intended computing instances 214 hosting software agents 230. A software agent 230 that receives the command message 204 may either, obtain the cryptographic key used to encrypt the command message 204 from the key management service 218, or submit the command message 204 to the key management service 218 for decryption of the command message 204. In one example, prior to sending the command message 204 to a particular computing instance 214, a worker thread 220 may determine whether the computing instance 214 (and/or a customer account associated with the computing instance 214) is assigned a security role that grants the computing instance 214 decryption permissions to the key management service 218. In the case that the computing instance 214 has not been assigned a security role with decryption permissions, the command invocation for that computing instance 214 may be terminated. After a command message 204 has been sent to each computing instance 214 specified in a command request, the encrypted command message 204 may be deleted from the temporary storage 236. Also, after executing a command as instructed in a command message 204, a software agent 230 may delete the command message 204 from memory of the computing instance 214 that hosts the software agent 230.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to modules and services included in the service provider environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network used to communicate with the service provider environment 202, as well as networks used be the services within the service provider environment 202 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain services may be discussed in connection with this technology and these services may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each service to enable a second service to send requests to and receive output from the first service. Such APIs may also allow third parties to interface with the services and make requests and receive output from the services. While FIG. 2 illustrates an example of a system that may implement the techniques above, many other similar or different environments are possible. The example environments discussed and illustrated above are merely representative and not limiting.

Figure 3:
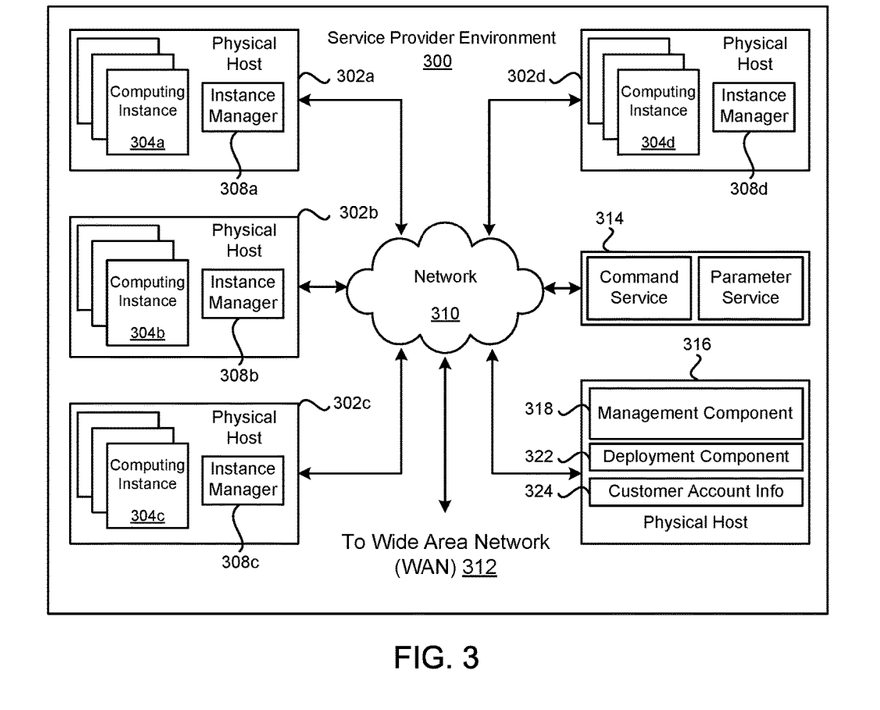
FIG. 3 is a block diagram that illustrates an example computing service environment that includes a command service.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d. The computing resources may be located at data centers managed by a computing service provider, as well as located at customer data centers on customer premises.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a command service and parameter service as described earlier. A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A server computer 316 may execute a management component 318. A customer may access the management component 318 to configure various aspects of the operation of the computing instances 304a-d purchased by a customer.

For example, the customer may setup computing instances 304*a-d* and make changes to the configuration of the computing instances 304*a-d*.

A deployment component 322 may be used to assist customers in the deployment of computing instances 304*a-d*. The deployment component 322 may have access to account information associated with the computing instances 304*a-d*, such as the name of an owner of the account, credit card information, country of the owner, etc. The deployment component 322 may receive a configuration from a customer that includes data describing how computing instances 304*a-d* may be configured. For example, the configuration may include an operating system, provide one or more applications to be installed in computing instances 304*a-d*, provide scripts and/or other types of code to be executed for configuring computing instances 304*a-d*, provide cache logic specifying how an application cache should be prepared, and other types of information. The deployment component 322 may utilize the customer-provided configuration and cache logic to configure, prime, and launch computing instances 304*a-d*. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302*a-d*, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
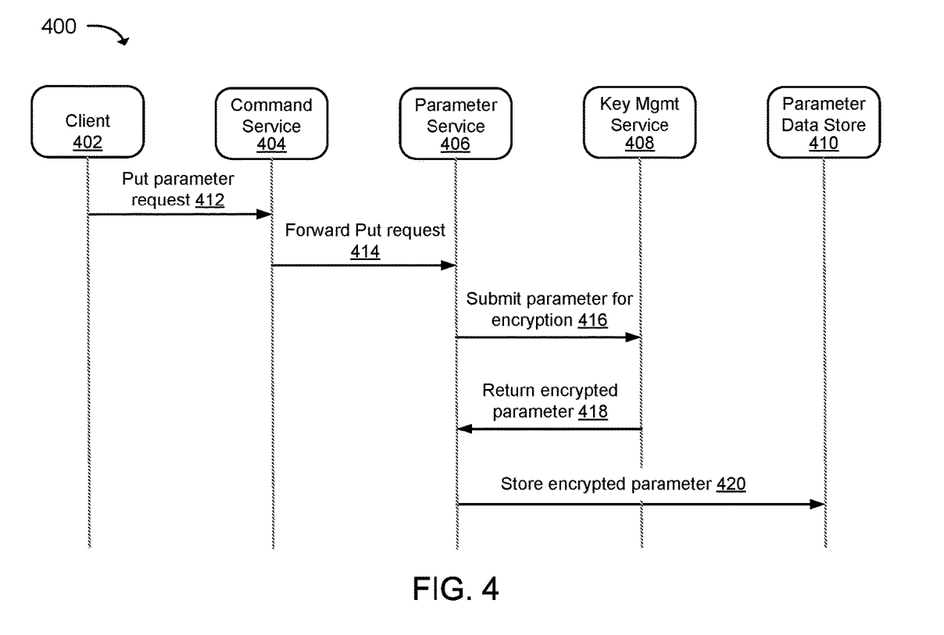
FIG. 4 is a flow diagram illustrating an example method for managing command parameters using a parameter service.

Moving now to FIG. 4, a flow diagram illustrates an example method 400 for managing command parameters using a parameter service 406. Customers of a computing service provider may manage their computing instances using commands that instruct the computing instances to perform a task. Commands can be invoked using a command service 404. For example, a customer may send a command request to a command service 404 and command invocations that include command instructions and command parameters may be sent to the customer's computing instances.

Command parameters included in command invocations may be managed by the parameter service 406. Customers may submit command parameters to the command service 404 for safekeeping and for inclusion in command invocations sent to the customer's computing instances as described in greater detail below in association with FIG. 5. As illustrated, a customer, via a client 402, may submit a command parameter to the command service 404. The client 402 may send the command parameter, along with a request 412 to manage the command parameter, to the command service 404. Illustratively, the request 412 may include a parameter-value pair, parameter metadata, and customer account information. Parameter metadata included in a request 412 may include, but is not limited to: a parameter identifier, name, description, data type (e.g., string, integer, decimal, date/time, etc.), and other parameter metadata.

Upon receiving a request 412 to manage a command parameter from a client 402, the command service 404 may forward the request 414 (including the parameter-value pair, parameter metadata, and customer account information) to the parameter service 406. In response to receiving the request, the parameter service 406 may submit 416 the command parameter to a key management service 408 for encryption using a cryptographic key (e.g., a customer's cryptographic key, or a cryptographic key generated on the customer's behalf). For example, a parameter value included in a parameter-value pair may be submitted to the key management service 408, which encrypts the parameter value and returns 418 the encrypted parameter value to the parameter service 406. Alternatively, the parameter service 406 may request a cryptographic key from the key management service 408, and the parameter service 406 may encrypt a parameter value included in a parameter-value pair using the cryptographic key. In one example, the parameter service 406 may first determine whether a customer account associated with a request is assigned a security role that provides permissions to encryption/decryption services provided by the key management service 408 before attempting to encrypt a command parameter. In some examples, a customer may indicate that a command parameter not be encrypted. In such a case, the command parameter may be stored in an unencrypted state.

After an encrypted command parameter has been returned 418 to the parameter service 406, the command parameter may be stored 420 to a parameter data store 410 for future inclusion in command invocations. In one example, the parameter data store 410 may include a data dictionary and a parameter table. A parameter-value pair that includes an encrypted parameter value may be stored in the parameter table, and parameter metadata for the parameter-value pair may be stored to the data dictionary. Thereafter, in response to a request for the command parameter, the parameter service 406 may identify the command parameter in the data dictionary using a parameter ID and retrieve a parameter value for the command parameter from the parameter table, as well as other parameter metadata (as may be requested) from the data dictionary.

Figure 5:
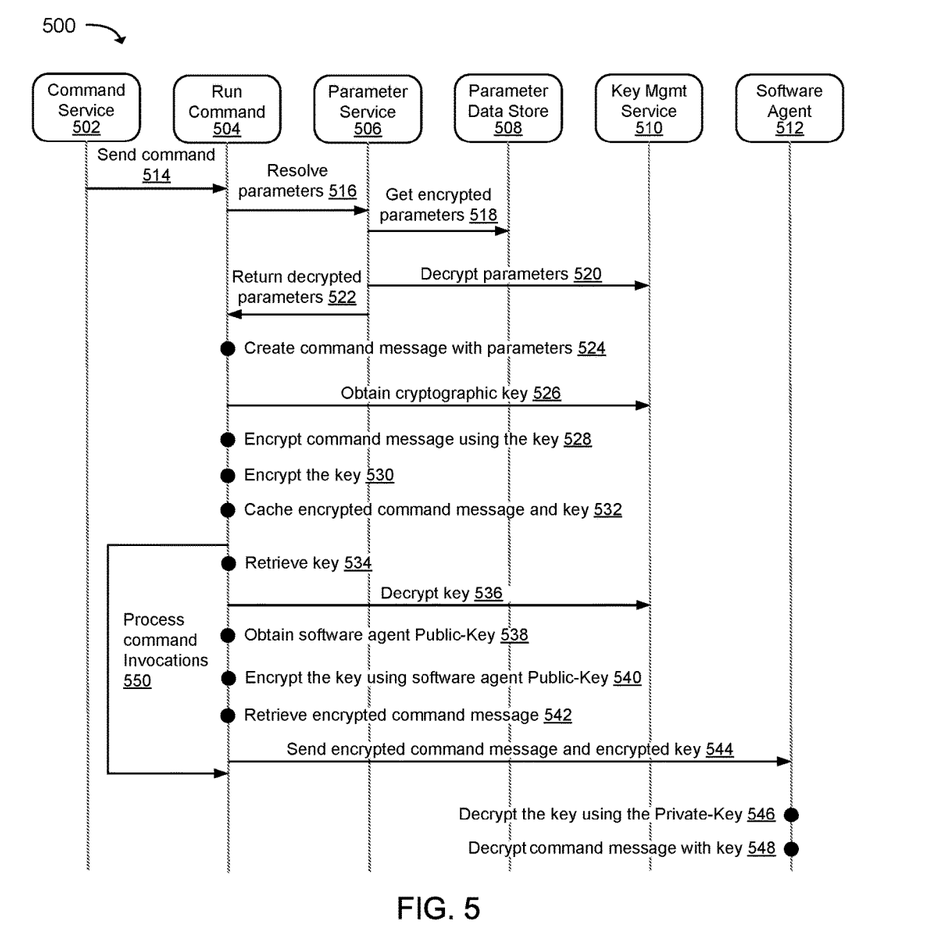
FIG. 5 is a flow diagram that illustrates an example method for processing command invocations that include command parameters.

FIG. 5 is a flow diagram illustrating an example method 500 for processing command invocations that include command parameters. As described above, a customer may submit command parameters to a command service 502 configured to manage the command parameters by way of a parameter service 506. The command parameters may be stored in a parameter data store 508 and the command parameters may be included in command invocations sent to a customer's computing instances that host software agents 512 configured to execute commands using the command parameters.

As a specific example, in response to a customer request to execute a software update over a set of the customer's computing instances, a command message that includes software update instructions may be generated. The software update instructions may include a reference to a software license parameter. The reference may be resolvable, and as such, the software license may be retrieved from a storage location and inserted into the software update instructions, and the command message may be sent to each of the customer's computing instances for execution.

In the example illustrated, the command service 502 may receive a send command 514 requesting that a command invocation be sent to one or more computing instances associated with a customer account. The command invocation may include command instructions and command parameters to be executed on the computing instances. Illustratively, the send command may include a command ID used to identify a command that is to be executed on one or more computing instances and either a list of computing instance IDs associated with computing instances that are to receive the command or a computing instance tag associated with a set of computing instances that are to receive the command. Also, the send command may specify a customer account which may be used to resolve any command parameters associated with the customer account. For example, command instructions for a command may include a reference to a command parameter (e.g., a software license parameter) and a customer account may be used to resolve the command parameter by identifying a parameter value (e.g., a software license key) associated with the customer account.

In response to receiving the send command 514, the command service 502 may forward the send command request to a run command 504. The run command 504 may be a service (e.g., a micro-service) configured to generate command invocations and send the command invocations to each computing instance specified in the send command. The run command 504 may evaluate the send command request to determine a command to invoke and command parameters to include in a command message. For example, the run command 504 may use a command ID included in a send command to identify command instructions for the command and identify any command parameters that may be included in the command instructions. A parameter ID may be obtained for each command parameter included in the command instructions. A parameter ID may include, but is not limited to, a parameter name or some other identifier that identifies a command parameter. In one example, a parameter ID may be obtained from command metadata associated with a command. In another example, a parameter ID may be obtained from command instructions for a command. The command instructions may be evaluated to identify parameter fields that contain parameter IDs, and the parameter IDs may be obtained from the command instructions.

Command parameters 516 included in the command instructions may be resolved by requesting parameter values for the command parameters from the parameter service 506, which may get encrypted parameters 518 from a parameter data store 508. As one example, the run command 504 may provide the parameter service 506 with a parameter ID along with a customer account associated with the send command, and the parameter service 506 may in turn use the parameter ID and the customer account to identify a parameter-value pair that is associated with the parameter ID and the customer account. An encrypted parameter value for the parameter-value pair may then be retrieved from the parameter data store 508. As a more specific example, the parameter service 506 may query a data dictionary for a parameter-value pair associated with the parameter ID and the customer account, and the parameter service 506 may then retrieve an encrypted parameter value for the parameter-value pair from the parameter data store 508.

After retrieving the encrypted command parameter from the parameter data store 508, the command parameter may be decrypted 520 using a cryptographic key managed by a key management service 510 and the decrypted command parameter may be returned 522 to the run command 504. More specifically, the parameter service 506 may submit an encrypted parameter value to the key management service 510 for decryption. In response, the key management service 510 may identify the cryptographic key associated with the customer account used to encrypt the parameter value, and unencrypt the parameter value using the cryptographic key. The key management service 510 may return the unencrypted parameter value to the parameter service 506, which then returns the unencrypted parameter value to the run command 504. In one example, a determination may be made that the customer account associated with the send command is assigned a security role that provides permissions to the key management service at the time the command service 502 received the send command.

The run command 504 may create a command message 524 that includes the command instructions for the command and the command parameter obtained from the parameter service 506. In one example, the command instructions may comprise attribute-value pairs that include information used by a software agent 512 hosted on a computing instance to execute a command. The run command 504 may evaluate the attribute-value pairs of the command instructions to identify an attribute-value pair associated with the command parameter and insert a parameter value for the command parameter in the value portion of the attribute-value pair. As a specific example, the attribute-value pairs of the command instructions may resemble:

{DocumentName: RegisterProductA,
CommandId: b4e32fc8-9667-4009-80e9-5a87c44d2f6c,
Parameters: {
   LicenseKey: KuLMp5eDGQN3X,
   ProductName: ProductionA,
   Feature: [Feature-A] }
}

The attribute-value pairs associated with command parameters ("LicenseKey", "ProductName", and "Features") may be identified and parameter values ("KuLMp5eDGQN3X", "ProductionA", and "Feature-A") may be inserted into the value portion of the attribute-value pairs.

After creating the command message, the run command 504 may obtain a cryptographic key 526 from the key management service 510 and encrypt the command message 528 using the cryptographic key. In one example, the key management service 510 may rotate cryptographic keys 526 using a key rotation technique. After obtaining the cryptographic key, the run command 504 may encrypt the cryptographic key 530 and cache the command message and the cryptographic key in storage for processing of command invocations by a worker thread as explained below. In one example, the run command 504 may submit the cryptographic key used to encrypt the command message to the key management service 510. The key management service 510 may encrypt the cryptographic key and then return the encrypted cryptographic key to the run command 504. In one example, the run command 504 may submit the cryptographic key to the key management service 510 using an alias assigned to the run command 504, resulting in encrypting the cryptographic key using a key assigned (owned) by the run command 504.

The run command 504 may assign a worker thread to process command invocations 550 that are sent to software agents 512 that execute the command instructions included in the command message. As indicated earlier, the send command may specify computing instances that are to receive the command message. The worker thread assigned to process the command invocations may generate a command invocation for each computing instance specified.

The worker thread may generate a command invocation by identifying a computing instance that is to receive the command invocation and sending the encrypted command message along with the cryptographic key (which is also encrypted) that was used to encrypt the command message to a software agent 512 hosted on the computing instance. More specifically, the worker thread may retrieve the cryptographic key 534 from cache and submit the cryptographic key 536 to the key management service 510 to be decrypted. In one example, the worker thread may submit the cryptographic key to the key management service 510 using the alias assigned to the run command 504. As a result, the key management service 510 may decrypt the cryptographic key using the key assigned to the run command 504 and return the decrypted cryptographic key to the worker thread.

At this point, the cryptographic key that was used to encrypt the command message (which is stored in cache) is in a decrypted state (e.g., plaintext). The worker thread may obtain a public-key 538 owned by the computing instance (and/or software agent 512) that is to receive the command invocation and encrypt the cryptographic key using the public-key 540. In one example, the public-key may be obtained from a data store (not shown) used to manage public-keys for computing instances included in a service provider environment. Having encrypted the cryptographic key using the public-key, the cryptographic key is again in an encrypted state. The worker thread may then retrieve the encrypted command message 542 from the cache and send the encrypted command message, along with the encrypted cryptographic key 544 to the computing instance.

The software agent 512 hosted on the computing instance may receive the encrypted command message and the encrypted cryptographic key, and thereafter, the software agent 512 may decrypt the cryptographic key using a private-key 546 owned by the computing instance and/or software agent. The cryptographic key now being in an unencrypted state (e.g., plaintext) may be used to decrypt the command message. After decrypting the command message, the software agent 512 can then execute the command included in the command message using the command parameters included in the command instructions.

The worker thread may generate and send a command invocation for each computing instance specified in the send command. Thereafter, the encrypted command message and the encrypted cryptographic key stored in the cache may be deleted and a message may be sent to the command service 502 indicating that the send command was successful. The example method 500 illustrated above is one example for resolving command parameters for inclusion in a command message. As will be appreciated, various other methods may be used to resolve command parameters and these methods are within the scope of this disclosure.

Figure 6:
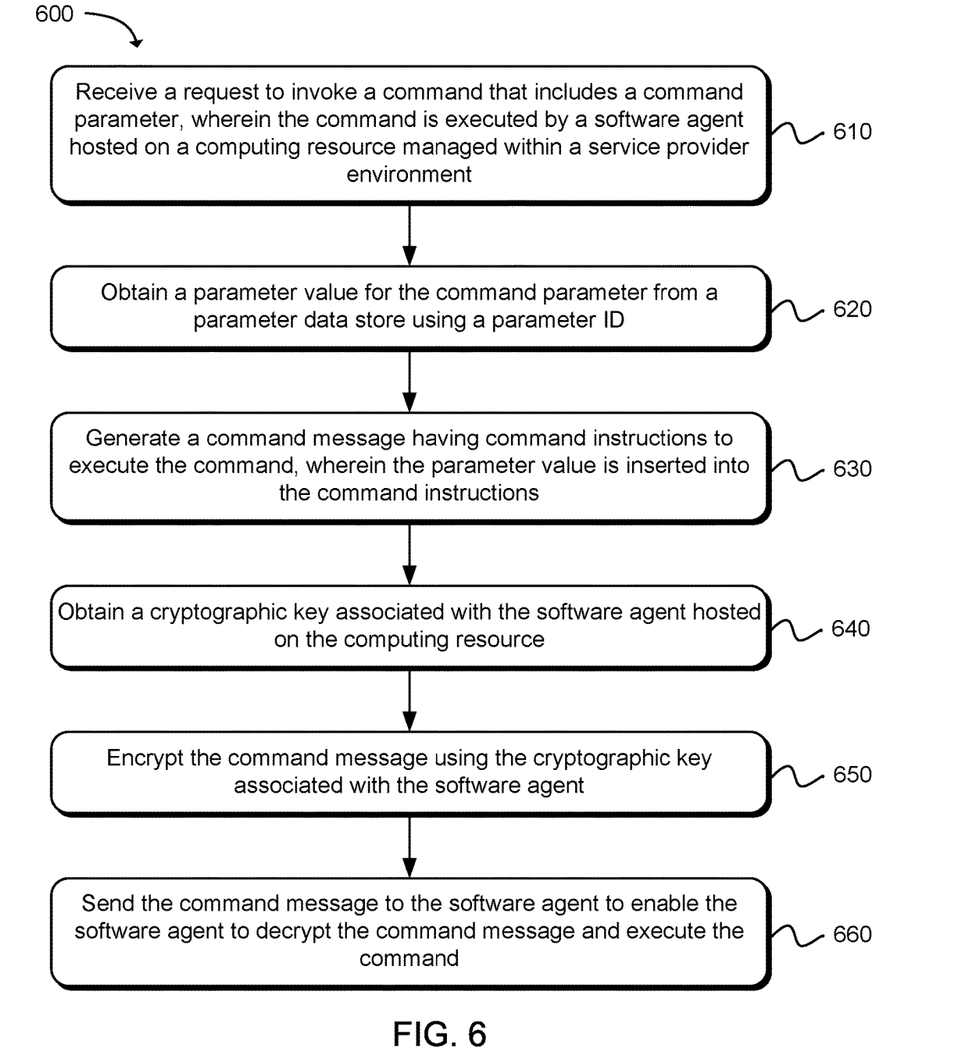
FIG. 6 is a block chart illustrating an example method for resolving command parameters included in command invocations.

FIG. 6 is a flow diagram that illustrates an example method 600 for resolving command parameters included in command invocations. Starting in block 610, a request may be received to invoke a command that includes a command parameter. The command may be sent to a software agent hosted on a computing resource managed within a service provider environment and the software agent may execute the command. In one example, the request may include a parameter ID that may be used to identify a parameter-value pair associated with a customer account.

As in block 620, a parameter value for the command parameter may be obtained from a parameter data store using the parameter ID. In one example, a determination may be made that the parameter value obtained from the parameter data store is an encrypted parameter value. In such a case, the encrypted parameter value may be submitted to a key management service that decrypts the encrypted parameter value using a cryptographic key associated with the customer account and returns a decrypted parameter value.

As in block 630, a command message having command instructions to execute the command on the computing resource may be generated. The parameter value obtained from the parameter data store may be inserted into the command instructions. As in block 640, a cryptographic key associated with the software agent hosted on the computing resource may be obtained, and as in block 650, the command message may be encrypted using the cryptographic key associated with the software agent. In one example, the cryptographic key may be a public-key owned by the computing resource. In another example, the cryptographic key may be obtained from the key management service, which may manage the cryptographic key on behalf of the customer account associated with the computing resource.

As in block 660, the command message may be sent to the software agent hosted on the computing resource. After receiving the command message, the software agent may obtain the cryptographic key and decrypt the command message using the cryptographic key. In one example, the software agent may decrypt the command message using a private-key owned by the computing resource. In another example, the software agent may obtain the cryptographic key from the key management service that manages the cryptographic key on behalf of the customer account. After decrypting the command message, the software agent may execute the command included in the command message and thereafter, delete the command message from memory of the computing resource that hosts the software agent.

Figure 7:
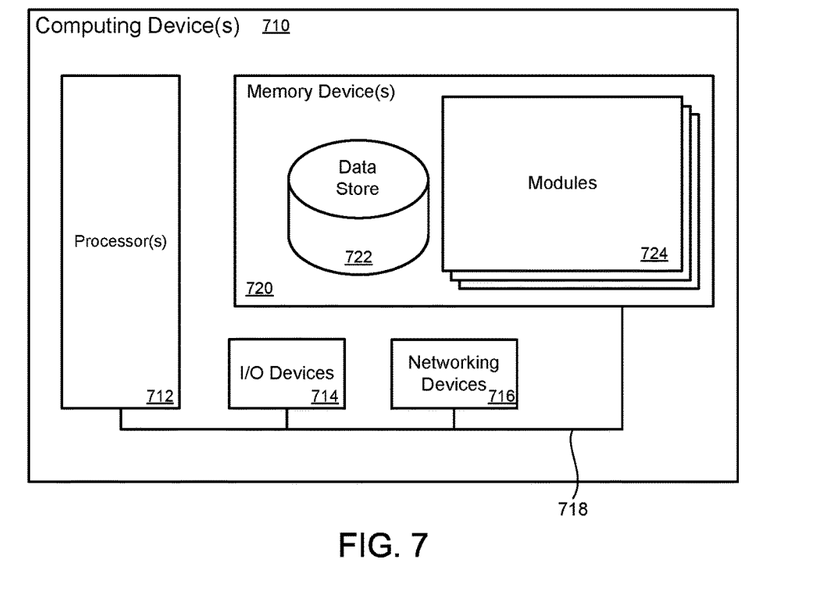
FIG. 7 is block diagram illustrating an example of a computing device that may be used to execute a method for resolving command parameters included in command invocations.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. For example, the memory device 720 may contain a command service module, a parameter service module, a run command module, a key management module, and other modules. The modules 724 may execute the functions and services described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory device 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for resolving command parameters included in command invocations comprising:
   a parameter data store configured to store parameter-value pairs;
   a set of computing instances managed within a service provider environment;
   at least a portion of one processor;
   at least one memory device including instructions that, when executed, cause the system to:
   receive a request to invoke a command, which has a command parameter, over the set of computing instances, wherein the request includes a parameter ID associated with a parameter-value pair;
   obtain an encrypted parameter value from the parameter data store, wherein the encrypted parameter value is included in the parameter-value pair associated with the parameter ID;
   decrypt the encrypted parameter value creating an unencrypted parameter value;
   generate a command message that includes instructions for the set of computing instances to execute the command;
   insert the unencrypted parameter value into a parameter field included in the instructions of the command message;
   generate an encrypted command message using a cryptographic key; and
   send the encrypted command message to a computing instance included in the set of computing instances, wherein the computing instance decrypts the encrypted command message using the cryptographic key and executes the command.

2. A system as in claim 1, wherein the at least one memory device includes instructions that cause the system to cache the command message, wherein the command message is retrieved to generate the encrypted command message to be sent to the computing instance.

3. A system as in claim 1, wherein the at least one memory device includes instructions that cause the system to:
   encrypt the command message prior to caching the command message; and
   decrypt the command message after retrieving the command message in order to send the command message to the computing instance included in the set of computing instances.

4. A system as in claim 1, wherein the at least one memory device includes instructions that cause the system to delete the command message after encrypted command messages have been generated for each computing instance included in the set of computing instances.

5. A system as in claim 1, wherein the at least one memory device includes instructions that cause the system to:
   encrypt the cryptographic key using a public key associated with the computing instance; and
   send the cryptographic key to the computing instance, wherein the computing instance decrypts the cryptographic key using a private key associated with the computing instance and decrypts the encrypted command message using the cryptographic key.

6. A computer implemented method, comprising:
   receiving a request to invoke a command that includes a command parameter, wherein the command is configured to be executed by a software agent hosted on a computing resource;
   obtaining a parameter value for the command parameter from a parameter data store, wherein a parameter ID associated with a parameter-value pair is used to obtain the parameter value;
   generating a command message that includes command instructions to execute the command with the parameter value in the command instructions;
   obtaining a cryptographic key associated with the software agent hosted on the computing resource;
   encrypting the command message using the cryptographic key associated with the software agent; and
   sending the command message to the software agent to enable the software agent to decrypt the command message and execute the command.

7. A method as in claim 6, further comprising determining that the parameter value obtained from the parameter data store is an encrypted parameter value.

8. A method as in claim 7, further comprising submitting the encrypted parameter value to a key management service that decrypts the encrypted parameter value using a cryptographic key associated with a customer account and returns a decrypted parameter value.

9. A method as in claim 6, wherein generating the command message further comprises placing the command instructions included in the command message into a data-interchange format.

10. A method as in claim 6, wherein generating the command message further comprises:
    obtaining the command instructions that comprise attribute-value pairs;
    identifying an attribute-value pair that is associated with the command parameter; and
    inserting the parameter value in a value portion of the attribute-value pair.

11. A method as in claim 6, wherein sending the command message to the software agent further comprises providing the command message to a worker thread that processes the request to send the command.

12. A method as in claim 11, wherein the worker thread sends the command message to a messaging service that provides the command message to the software agent for invocation.

13. A method as in claim 6, further comprising determining that the software agent is assigned a security role that allows the software agent to submit the command message to a key management service that decrypts the command message using a cryptographic key associated with a customer account.

14. A method as in claim 13, further comprising terminating a command invocation as part of determining that the software agent is not assigned the security role.

15. A method as in claim 13, wherein the cryptographic key is generated by the key management service or the cryptographic key is provided by a customer.

16. A method as in claim 6, wherein the software agent deletes the command message from memory of the computing resource that hosts the software agent after executing the command.

17. A method as in claim 6, wherein the computing resource that hosts the software agent is located in a service provider environment or a customer data center on customer premises.

18. A non-transitory machine readable storage medium including instructions embodied thereon, the instructions when executed by a processor:
    store a parameter-value pair that includes an encrypted parameter value in a parameter data store that is accessible to a command service configured to handle requests to invoke the commands on computing instances;

receive a request to invoke a command on at least one computing instance, wherein the request includes a parameter ID associated with the parameter-value pair stored in the parameter data store;

obtain the encrypted parameter value from the parameter data store using the parameter ID;

decrypt the encrypted parameter value, thereby providing the parameter value;

generate a command message that includes the parameter value, the command message includes instructions for the at least one computing instance to execute the command using the parameter value; and send the command message to the at least one computing instance.

19. A non-transitory machine readable storage medium as in claim 18, wherein the parameter-value pair is associated with a customer account and the parameter-value pair is managed by a service provider.

20. A non-transitory machine readable storage medium as in claim 18, wherein the instructions that when executed by the processor further obtain a cryptographic key from a key management service, wherein the cryptographic key is used to encrypt and decrypt the parameter value included in the parameter-value pair.

21. A non-transitory machine readable storage medium as in claim 20, wherein the instructions that when executed by the processor further determine that a customer account associated with the parameter-value pair is assigned a security role that provides permissions to access the key management service.

* * * * *